June 24, 1930. S. L. MARSH 1,765,929

HYDRAULIC SHOCK ABSORBER

Filed Jan. 7, 1929

Inventor
S. L. Marsh,
By Shoemaker & Sardine
Attorney

Patented June 24, 1930

1,765,929

UNITED STATES PATENT OFFICE

SAMUEL L. MARSH, OF NEW YORK, N. Y.

HYDRAULIC SHOCK ABSORBER

Application filed January 7, 1929. Serial No. 330,786.

This invention relates to hydraulic shock absorbers, and more particularly, is adapted to eliminate what is commonly known as water hammer, which is produced by sudden stoppage of flow of water or other fluid passing through pipe systems.

I am perfectly familiar with previous attempts to eliminate water hammer in which it has been attempted to provide a casing containing a diaphragm of leather, rubber, or other flexible material and connecting the diaphragm to the pipe system so that shocks generated in the water stream act to displace the diaphragm and also in which corrugated cylinders have been used to permit displacement, but in the present case the flexing of the diaphragm is so small that the element of displacement is negligible. On the contrary, my invention operates on the theory of permitting the diaphragm to vibrate synchronously with the waves of pressure generated in the flowing stream, so that the shocks are absorbed or damped out.

An object of my invention is to provide a diaphragm against which the water or other stream of fluid is directed and to make this diaphragm out of spring metal, which permits of rapid vibration and yet will not warp out of normal position.

An additional object of my invention is to provide reinforcing elements for the diaphragm so as to insure longer life thereof.

An additional object of the present invention is to provide cushioning means for the main diaphragm by means of which each of the cushioning elements absorbs its proportionate share of shock, thereby gradually reducing the shocks that are to be absorbed by the main diaphragm.

A further object is to provide means between the cushioning elements to eliminate friction therebetween.

Other objects and advantages of the present invention will appear as the description proceeds, but I desire it to be clearly understood that changes may be made in the proportions, details of construction or the arrangement of parts, without departing from the spirit of the invention as defined in the appended claims.

In describing the invention, reference will be had to the accompanying drawings, forming part thereof and in which corresponding parts are similarly numbered throughout the several views. In these drawings.

Figure 1:
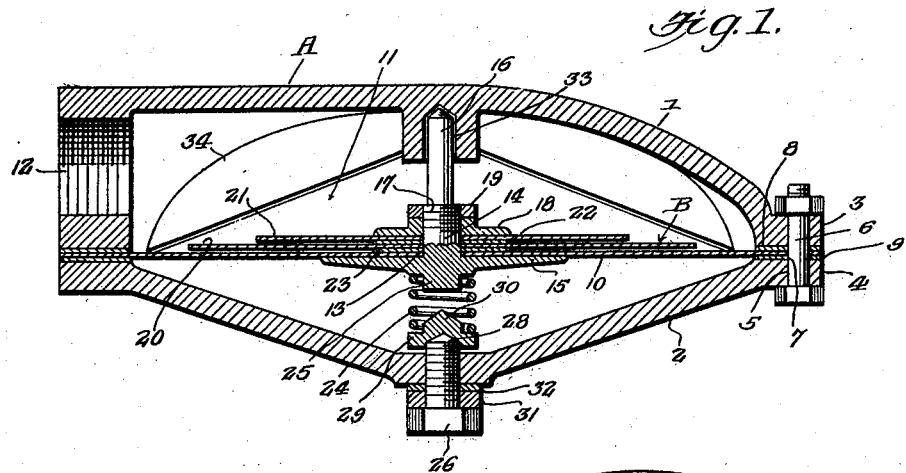
Fig. 1 is a vertical central sectional view of my device.

Referring more particularly to the drawings, the invention consists of a casing or shell generally indicated at A and comprising an upper section 1 and a lower section 2 which are provided with marginal flanges 3 and 4, respectively, having bolt holes 5 therein through which bolts 6 are adapted to be passed for securely clamping the sections together.

Interposed between casing sections 1 and 2 is a diaphragm structure generally indicated at B, which is likewise provided with openings 7 registering with the bolt openings 5 in the casing.

To insure a water-tight joint between the sections 1 and 2, I provide the packing rings 8 and 9, which are adapted to engage the marginal flanges 3 and 4 and lie on opposite sides of the diaphragm structure.

It will thus be seen that by registering the bolt holes in the sections 1 and 2 and in the diaphragm and passing the bolts 6 therethrough, the sections may be readily secured together, and leakage of water or other fluid from the casing is prevented by the packing rings 8 and 9.

The diaphragm structure generally indicated at B comprises a main diaphragm 10 which extends entirely across the casing and divides the same so as to provide a fluid chamber 11, which receives the water or other fluid to be treated through the inlet opening 12, which is screw threaded so as to be adapted to a fluid pipe system.

The main diaphragm 10 is provided with a central opening 13 through which is passed a stop pin 14 provided with an enlarged head 15 and a reduced end 16. The stop pin intermediate its ends is screw threaded, as indicated at 17, to receive the packing nut 18, which is securely locked in place by means of the nut lock 19.

In addition to the main diaphragm 10 I provide supplemental diaphragms 20 and 21 which are likewise provided with central openings to receive the stop pin 14, and between the diaphragms 10, 20 and 21 are provided spacing washers 22 and 23, the purpose of which is to space the main diaphragm 10 from the supplemental diaphragm 20 and the supplemental diaphragm 20 from the supplemental diaphragm 21.

Figure 2:
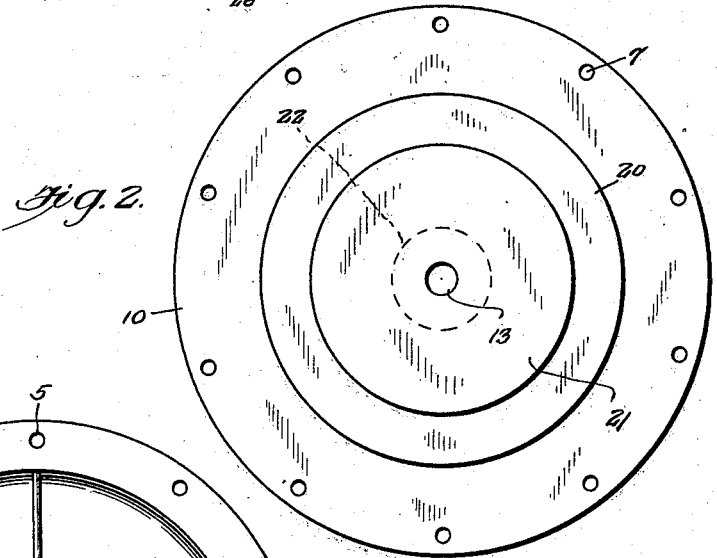
Fig. 2 is a plan view of the diaphragm structure.
Figure 3:
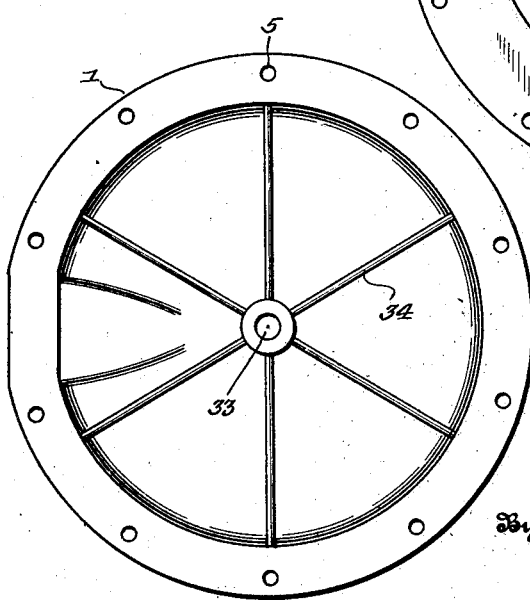
Fig. 3 is an inverted plan view of the top section of the casing.

With particular reference to Fig. 2, it will be seen that the diaphragms are of successively increasing area and form, when completely assembled on the stop pin 14, a resilient structure which in operation provides substantially a cantilever spring action.

The diaphragms 10, 20 and 21 are all made of spring metal, preferably spring copper, and are, therefore, inherently resilient, which resiliency normally tends to retain the diaphragms in a flat condition, and after the shock in the fluid stream has been absorbed by action of the spring diaphragms, they will return to normal position due to the spring character of the diaphragms themselves.

The spacing washers 22 and 23 are provided between the diaphragms so as to provide spaces therebetween to permit the water or other fluid entering the diaphragm chamber 11 to pass between the diaphragms, thereby cushioning one upon the other.

It has been found that after long usage the diaphragm structure tends to warp, and in order to overcome this difficulty I provide an adjustment, which consists of a spring 24 adapted to encircle a stud 25 on the end of the stop pin 14, and the tension of the spring 24 can be varied by means of the adjusting nut 26 provided with a threaded stem 28 terminating in a conical point seated in a recess in the compression nut 29. This compression nut 29 is provided with a stud 30 which is encircled by the opposite end of the spring 24, and between the adjusting nut 26 and the section 2 of the casing I place the washers 31 and 32. It will thus be seen that by adjusting the nut 26 the tension of the spring 24 can be varied so as to return the main diaphragm 10 to its normal position, and I desire it to be understood that the spring 24 is not primarily for the purpose of returning the diaphragm 10 to its normal position after each vibration, as this is accomplished by the resiliency of the diaphragm itself. The spring 24 is mainly for the purpose of taking care of any warpage resulting from long usage.

In the top shell 1 of the casing I provide the socket 33, adapted to receive the reduced end of the stop pin 14, and it is to be noted that the socket opening is of slightly larger diameter than the reduced portion of the stop pin. The space between the reduced end of the stop pin 14 and the socket is to enable the diaphragm structure to vibrate freely, it being readily understood that in some cases one side of the diaphragm may be vibrating at one speed and the opposite side of the diaphragm vibrating in an entirely different manner, and in order to accommodate this unequal vibration of the diaphragm structure, it has been found necessary to permit movement laterally and longitudinally and vertically of the stop pin 14.

The top section 1 of the casing A is provided with ribs 34, which radiates from the socket 33 and which lie in the path of travel of the fluid entering the casing through the inlet 12. These deflecting ribs are for the purpose of breaking up the waves of pressure in the fluid stream and projecting them toward the diaphragm structure at constantly varying angles, thereby insuring the damping out or absorption of the vibrations quickly and effectively.

It will be seen from the foregoing description that I have provided a very simple, inexpensive and efficient device for entirely eliminating objectionable hammer in water pipes and other fluid systems, and that due to the character of the diaphragm employed, all vibrations will absorb quickly, and that the construction is such as to need no attention after installation, and that the construction will eliminate any question of warpage due to constant and long use.

I claim:

1. A device for preventing water hammer and the like, comprising a shell having an inlet communicating with a pipe system, a spring metal diaphragm providing a fluid receiving chamber communicating with said inlet, the said diaphragm being adapted to vibrate synchronously with the vibration in the fluid, and a plurality of flat spring metal reinforcing elements located adjacent said diaphragm and spaced to permit the fluid entering the receiving chamber to pass between the reinforcing elements, whereby to strengthen and cushion the diaphragm during vibration thereof.

2. A device for preventing water hammer and the like, comprising a shell having an inlet communicating with a pipe system, flat laminated diaphragm structure dividing the shell and providing a fluid receiving chamber, said diaphragm structure comprising a stop pin and a plurality of diaphragms of succeedingly increasing diameter secured to said stop pin in superposed spaced relation to each other.

In testimony whereof I have hereunto set my hand this 4th day of January, 1929.

SAMUEL L. MARSH.